Patented June 14, 1927.

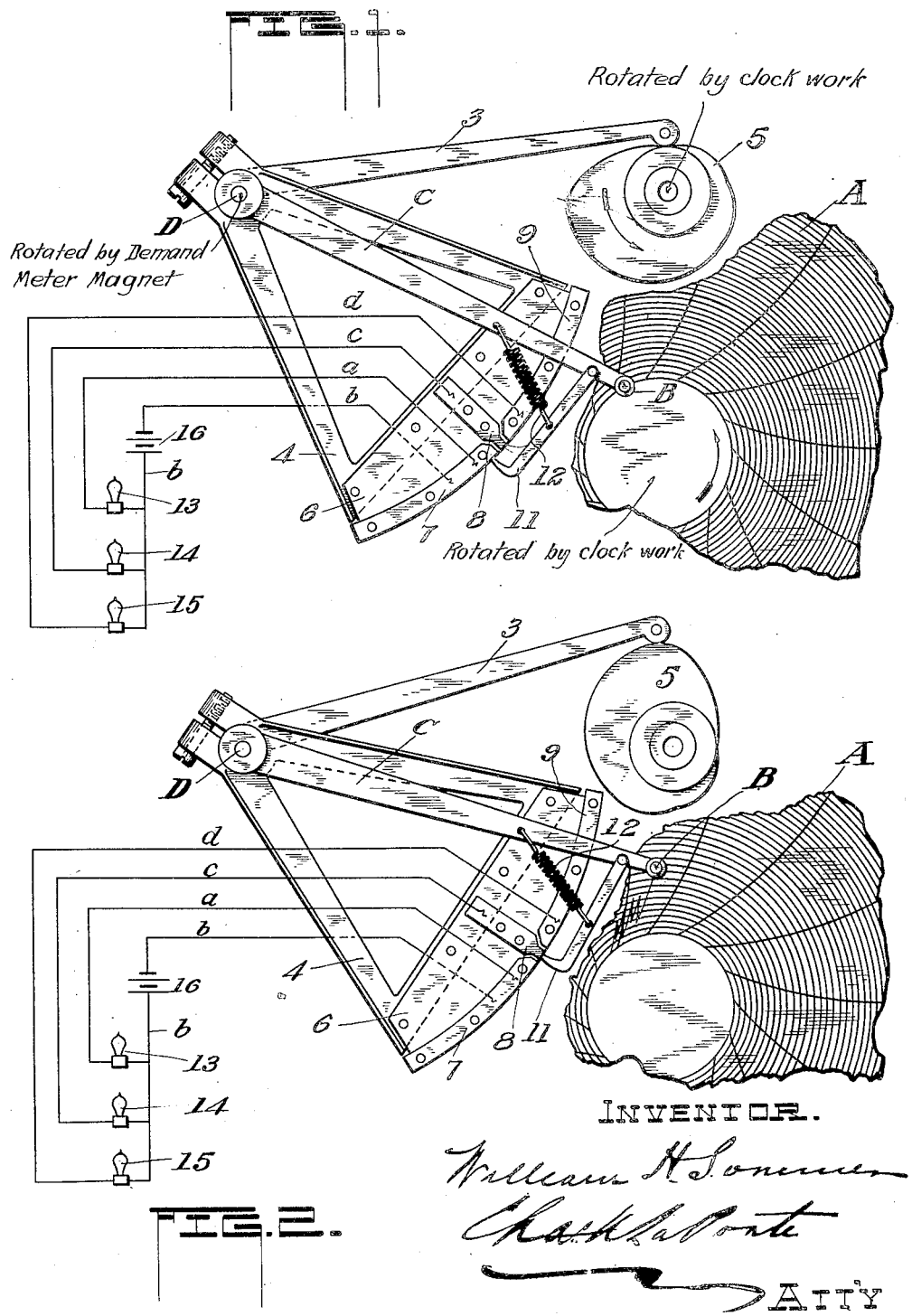

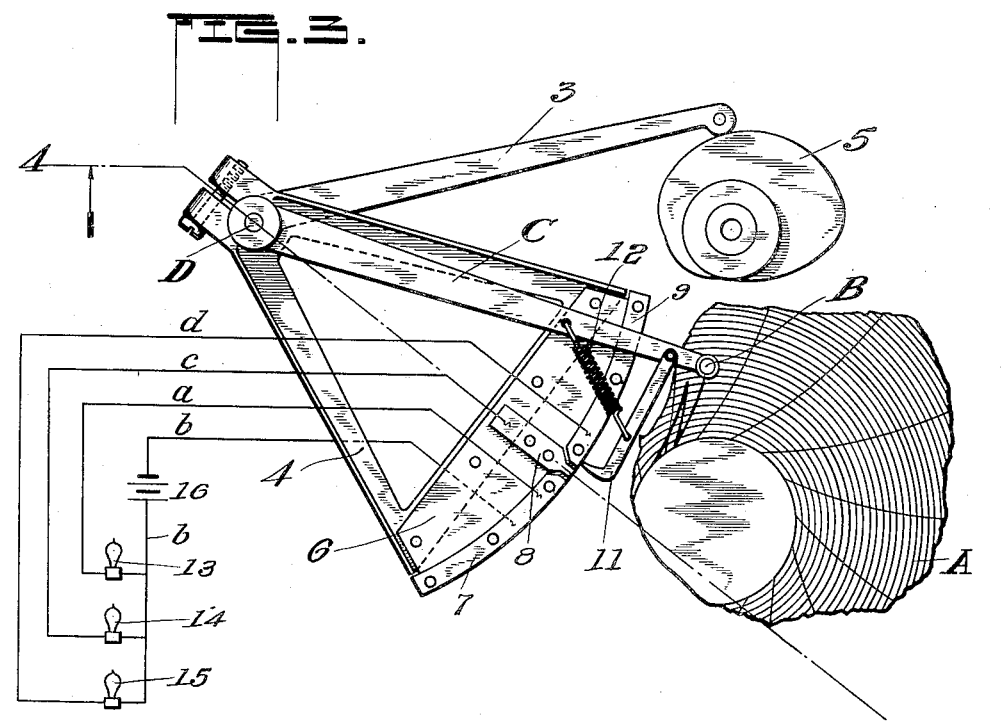
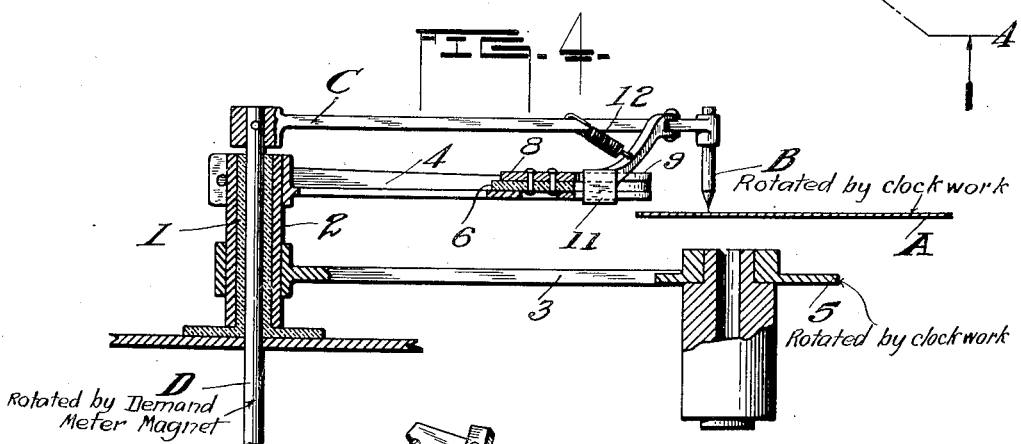
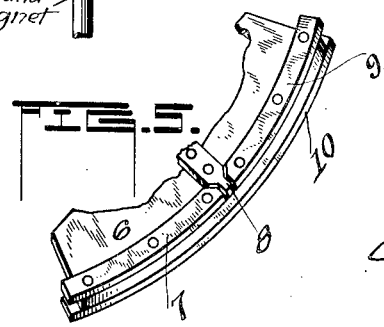

1,631,987

UNITED STATES PATENT OFFICE.

WILLIAM H. SOMMER, OF PEORIA, ILLINOIS, ASSIGNOR, BY MESNE ASSIGNMENTS, TO THE UNION TRUST COMPANY, OF CLEVELAND, OHIO, A CORPORATION OF OHIO, AND JOHN A. CHAPMAN, OF CHICAGO, ILLINOIS, TRUSTEES.

ATTACHMENT FOR ELECTRIC-CURRENT DEMAND METERS.

Application filed August 10, 1921. Serial No. 491,237.

This invention has reference to an attachment for electric current demand meters.

The invention has for its principal object to provide an attachment for electric current demand meters, which includes an alarm, adapted to warn the operator, when the demand reaches a predetermined point; thus enabling him to know when to stop certain operations in order to keep the demand within certain limits.

The invention has for a further object to provide power demand regulation to enable the consumer of power to exceed any predetermined demand rate of power consumption as long as the total demand is not exceeded within or at the end of any such predetermined power demand period.

That the invention may be more fully understood, reference is had to the drawings forming a part of the description, illustrating a preferred embodiment of the invention, in which:

Figure 1 is a fragmentary view, illustrating in a diagrammatic way, so much of an electric current demand meter as is necessary to show the application and use of my attachment associated therewith, the parts being in normal position;

Figure 2, is a view somewhat similar to Figure 1, except that the demand in kilowatts has been reached and my attachment has been actuated and a warning given to the operator that such demand has been reached;

Figure 3 is a view somewhat similar to Figures 1 and 2, except that the demand in kilowatts has been exceeded and the additional warning given to the operator that the demand has been exceeded;

Figure 4 is a fragmentary sectional view thru the meter and my attachment, as the same would appear, if taken on the line 4—4 of Figure 3, and Figure 5 is a detail perspective view of a contact plate in the attachment.

Like characters of reference denote corresponding parts thruout the figures.

*Explanation of demand meters.*—Those skilled in the use of electric current demand meters understand that such meters are used by consumers of electric current for power purposes, to measure how fast the current is used, and that such meters are controlled from "watt-hour" meters, which measure the quantity of current used.

It is further, well understood, by users of electric current for power purposes that the demand or rate of use of current is the basis of charges made for such current, and that on such basis, the customer taking power from the power company is penalized by being charged more for his current, if he uses current and exceeds the demand called for in his contract, because the higher the demand on the power station, the more generating equipment must be held in reserve to meet the demand.

It is therefore, to the advantage of both the customer and the power company, if the customer shall use the current at a more uniform rate, and it is the object of the attachment which I have provided, usable in connection with such electric current demand meters, to warn the consumer by an audible signal or glow from a lamp or lamps when the demand has reached a predetermined point, thus enabling him to know when to stop certain operations in order to keep the demand within certain limits.

In demand meters of well known construction the rate of use is measured in certain "time" periods, usually fifteen (15) minutes long. The various rates of use at different times during the fifteen (15) minute periods are added continuously, and at the end of the "time" period, the marker or recorder is set back to zero and the operation started for another time period. These meters include a chart on which the demand in kilowatts is marked, the marker or recorder being actuated by a magnet, which is in turn actuated from the "watt-hour" meter. All of which, it is believed, will be understood.

*Demand meter.*—Such a meter includes a chart A, adapted to be connected to and rotated from a suitable power source, such as clock-work, not shown. The demand in kilowatts is marked on this chart, preferably by a suitable marker or recorder B, connected by an arm C with a shaft D, arranged for actuation by a magnet, not shown, controlled and actuated from a "watt-hour" meter, not shown.

The foregoing described parts constitute the essential elements of an electric current demand meter, and the showing and description are thought sufficient to illustrate the application and use of the attachment to be described.

*Attachment.*—The shaft D in the casing of the meter is journaled in a bearing 1, and on such bearing is a sleeve 2 to which is connected the spaced members 3 and 4, the former an arm, the free end of which rides on a cam member 5 rotating continuously and is sensitive to such movement, in that it will ride on the cam as it is revolved by gravity or any other suitable means, and the oscillation of the arm is imparted to the sleeve 2 and to the member 4. The latter member 4 is a segmental arm, in the form of a quadrant which has attached thereto an insulating plate 6 with the spaced segmental contact plates 7, 8 and 9 attached thereto, on one side, in spaced relation and the comparatively long contact plate 10 attached to the other side thereof, but all flush with the peripheral surface of the insulating plate 6. To the arm C carrying the marker or recorder B, is pivotally connected a contact arm 11 which is adapted to ride on the peripheral surface of the insulating plate 6 and to have continuous contact with the contact plate 10, and a broken contact with the contact plates 7, 8 and 9, as best seen in Figures 1, 2 and 3. The cam 5 may be operated from the power source of the meter such as the clockwork which rotates the chart, or in any desired manner. The arm 11 is held in contactual relation with the plates 7, 8, 9 and 10 by a spring 12 connected to the arm 11 and the arm C.

The alarm in this instance I prefer in the form of a signal from the glow of lamps 13, 14 and 15, in circuit with a suitable battery 16. The lamp 13 is in a circuit $a, b$, the terminals of which are connected, respectively, with the plates 7 and 10. The lamp 14 is in a circuit $c, b$, the terminals of which are connected, respectively, with the plates 8 and 10, and the lamp 15 is in a circuit $d, b$, the terminals of which are connected, respectively with the plates 9 and 10.

In operation, it will be understood that the members 3 and 4 are oscillated in unison and simultaneously, the two being controlled entirely by the cam 5 which rotates continuously, one turn in the desired interval or time period. That is to say, the oscillation of the member 4 is predetermined by the cam, and is set to have a maximum movement corresponding to a maximum demand over which the customer does not want to go. This is not true of the arm C carrying the marker or recorder B, as it may not only move correspondingly to and in unison and simultaneously with the member 4, but it may have an irregular movement, traveling ahead of the member 4, its movement being entirely regulated by the rate of use of electric current.

For example, when the arm C and the members 3 and 4 are moving in unison and the contact arm 11 remains in contact with the contact plates 7 and 10, the rate of demand or rate of use is uniform and according to contract or schedule; the glow from the lamp 13 indicating this, as the contact of the plate 11 with the plates 7 and 10 causes the current to flow thru the circuits $a, b$, including the lamp 13.

If the rate of use is increased during any fifteen (15) minute period, the movement of the arm C is accelerated causing the contact plate 11 to leave the plate 7 and overtake the plate 8, as seen in Figure 2 closing the circuit $c, b$, causing a glow in the lamp 14 in such circuit. This will warn the operator that the demand has been reached. On the other hand, if the operator fails to heed the warning given by the lamp 14, or for any reason disregards it, and the arm C continues its movement in advance of the speed of the member 4, the contact plate 11 will leave the plate 8 and overtake the plate 9, as seen in Figure 3, closing the circuit $d, b$, causing a glow in the lamp 15 in such circuit. This will warn the operator that the predetermined demand has been exceeded, and in order to keep the demand within certain limits he may stop certain operations, until the marker or recorder is set back to zero.

From the foregoing description and operation it should be obvious that the power consumer may exceed his demand rate of power consumption at any time within a predetermined period as for instance, fifteen minutes, as long as when the end of the fifteen minute period is reached the total demand has not exceeded his predetermined demand.

In case this predetermined demand of power consumption is exceeded within the predetermined period, the device will give the proper warning signals in ample time to give the consumer of power an opportunity to cut down his rate to stay within his predetermined demand, at the end of the fifteen minute period.

If, for example, we will assume that the consumer of power wishes to limit his maximum demand during fifteen minutes to 15,000 k. w., this would mean an average rate of use of 1,000 k. w. per minute. However, the actual rate of use per minute may be more or less than this average, during the fifteen minutes, without exceeding the predetermined demand of 15,000 k. w. at the end of the fifteen minute period.

In explanation of this, reference is had to Figure 2 in which the cam 5 is given a predetermined shape which will bring the arms 3 and 4 and the segment 8 attached thereto, to a position at the end of the fifteen minute period which will correspond to a power consumption of 15,000 k. w. This cam can have any shape the consumer may desire, not necessarily corresponding to an average rate of use of 1,000 k. w. per minute. In fact, it has been found advantageous to allow more latitude during the first part of the fifteen minute period so that the consumer of power may use power more rapidly if he desires, during the first part of the demand period.

The movement of arm C may or may not coincide with the movement of the arms 3 and 4. These are independent of each other and are controlled by separate means as has been explained before.

The chart A forming a part of the demand meter is rotated by clock mechanism such as is common in demand meters and well known to those skilled in the art; the cam 5 is rotated preferably continuously, by the clock mechanism which is used to actuate the chart A; the marker arm C, as has been described, is connected with the shaft D which is operated from a watt-hour meter and its actuation as will be understood, from and by a means, separate and distinct from the clock mechanism of the demand meter, when actuated, marks the chart for the purpose of graphically indicating or recording the demand within the predetermined period, and the arm 3, which rides on the cam 5, and the arm 4 are connected to be actuated in unison whereby to bring the contact members into contact with the member 11 for the purpose of actuating the signaling means which indicates either that the predetermined rate of use has not been reached or that it has been reached or that it has been exceeded.

What I claim is:—

1. A maximum demand controller for an electric recording demand meter of the equal time period type comprising signaling means and means operable concurrently with the recording element of the meter but at a uniform rate to actuate said signaling means when said meter indicates that a predetermined demand rate is being exceeded during the latter portion of said predetermined time period.

2. In combination with an electric recording demand meter of the equal time period type comprising signaling means an element adapted to describe a certain motion as a basis of comparison, another element describing a motion according to the actual rate of demand of electrical energy during said equal time period and means whereby the relative motion between these two elements is used to operate said signaling means.

3. In combination with an electric recording demand meter of the equal time period type comprising signaling means to indicate when a certain predetermined condition has been exceeded, an element adapted to describe a certain motion having as its basis a predetermined energy demand, another element describing a motion according to the actual rate of demand of electrical energy during said equal time period and means whereby the relative motion between these two elements is used to operate said signaling means.

4. In combination with an electric recording demand meter of the equal time period type comprising signaling means, a cam mounted on the period resetting shaft of the demand meter adapted to describe a certain motion having as its basis a predetermined energy demand, a recording stylus arm describing a motion according to the actual rate of demand of electrical energy during said equal time period and a segmental contact arm for utilizing the relative motion between the cam and the stylus arm to operate said signaling means.

5. In combination with an electric recording demand meter of the equal time period type comprising signaling means, an element adapted to describe a certain motion as a basis of comparison, another element describing a motion according to the actual rate of demand of electrical energy during said equal time period and movable means whereby the relative motion between these two elements is used to actuate certain of said signaling means when said meter reaches a predetermined demand and to actuate certain other of said signaling means when the predetermined demand has been exceeded.

6. In combination with an electric recording demand meter of the equal time period type having a chart and a marker arm movable according to the rate of use of electrical energy and including signaling means, an element adapted to describe a certain motion as a basis of comparison, and switch means partially controlled by an accelerated movement of the marker to actuate said signaling means when the marker indicates that a predetermined demand has been reached.

7. In combination with an electric recording demand meter of the equal time period type having a chart and a marker arm movable according to the rate of use of electrical energy and including signaling means operable at different demand, an element adapted to describe a certain motion as a basis of comparison, and a selective actuating means or said signaling means partially controlled by the movement of said marker arm, whereby when a predetermined demand is reached one of said signaling means is actuated, and when said predetermined demand is exceeded certain other of said signaling means is actuated.

8. In combination with an electric recording demand meter of the equal time period type having a meter chart, marker and shaft for actuating the marker according to the rate of use of electrical energy and including signaling means operable at different demands, an electric circuit including said signaling means, an element on said shaft in said circuit adapted to move in coincidence with or at variance with said marker, insulated electrical contacts carried by said element, an element adapted to describe a certain motion as a basis of comparison for moving said element independently of the movement of the marker, and means controlled by said marker adapted to have a selective contact with the contacts on said element, whereby said signaling means is actuated both when the maximum demand is reached and exceeded.

9. An attachment for an electric current demand meter of the equal time period type having recording means to indicate the rate of use of electric energy, including signaling means, and means comprising a segmental contact arm adapted for association with said recording means and movable by an element adapted to describe a certain motion as a basis of comparison in coincidence with and also at variance to said recording means to actuate said signaling means when a predetermined rate of use of electric energy has been reached.

10. In combination with a recording demand meter of the equal time period type, including a member movable for each time period over a path determined by the rate of use of the energy, means including a second member adapted to move at a uniform speed over a path having as its basis a predetermined energy demand and having a plurality of contacts thereon, and means carried by said first member for closing a circuit through the respective contacts as the first member equals or varies in its movement from the uniform speed of said second member.

11. In a recording demand meter of the equal time period type, means movable to indicate the rate of use of energy which is variable during the said time period, a contact-bearing member adapted to be moved coincidentally with said means but at a constant continuous speed during said time period, and means operable by said first means for closing a circuit through a contact and said contact-bearing member when said first means is accelerated by an excessive energy demand during said time period.

12. A maximum demand controller for an electric recording demand meter of the equal time period type comprising a series of signaling means and means operable concurrently with the recording element of the meter but at a uniform rate to actuate certain of said signaling means when said meter indicates that a predetermined demand rate is being exceeded during the latter portion of said predetermined time period and to effect constant operation of another of said signaling means when said meter indicates that the predetermined rate of use has not been reached.

WILLIAM H. SOMMER.